United States Patent
Flegler et al.

(10) Patent No.: US 9,885,246 B2
(45) Date of Patent: Feb. 6, 2018

(54) SEALING ARRANGEMENT OF A STEAM TURBINE IN WHICH A SEALING LIQUID AND A VAPOR STEAM EXTRACTION SYSTEM ARE USED

(71) Applicant: Siemens Aktiengesellschaft, Munich (DE)

(72) Inventors: Johan Flegler, Essen (DE); Thomas Helmis, Mulheim an der Ruhr (DE); Norbert Surken, Mulheim a.d. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 14/415,387

(22) PCT Filed: Jun. 17, 2013

(86) PCT No.: PCT/EP2013/062464
§ 371 (c)(1),
(2) Date: Jan. 16, 2015

(87) PCT Pub. No.: WO2014/016048
PCT Pub. Date: Jan. 30, 2014

(65) Prior Publication Data
US 2015/0167485 A1     Jun. 18, 2015

(30) Foreign Application Priority Data

Jul. 24, 2012     (EP) .................................. 12177570

(51) Int. Cl.
*F01D 11/02*     (2006.01)
*F01D 11/04*     (2006.01)
*F16J 15/40*     (2006.01)

(52) U.S. Cl.
CPC .............. *F01D 11/02* (2013.01); *F01D 11/04* (2013.01); *F16J 15/40* (2013.01)

(58) Field of Classification Search
CPC ............ F01D 11/02; F01D 11/04; F16J 15/40
See application file for complete search history.

(56) References Cited

U.S. PATENT DOCUMENTS 1,425,548 A * 8/1922 Schmidt .................. F01D 11/02
                                                                    277/427
1,551,549 A * 9/1925 Flanders ................. F01D 17/00
                                                                    137/38
(Continued)

FOREIGN PATENT DOCUMENTS

CA     2381359 A1     2/2001
CN     1121740 A      5/1996
(Continued)

OTHER PUBLICATIONS

Han Lei; "Research and application of transformation of steam turbine rear shaft seal water seal device", Modern Business Trade Industry, issue 4, pp. 301-302; 2010; Translation not available. Summary: The document discloses a system for sealing a passage for a rotating shaft by means of condensed water in a steam turbine, as shown in Fig. 2 on p. 301.

*Primary Examiner* — Dwayne J White
*Assistant Examiner* — Adam W Brown
(74) *Attorney, Agent, or Firm* — Beusse Wolter Sanks & Maire

(57) ABSTRACT

A sealing arrangement for a duct, through a stationary housing, of a shaft which rotates about an axis is provided, wherein a sealing liquid is used for sealing instead of sealing steam. The sealing arrangement includes a seal, having a vapor steam extraction system, and a feed line, which is arranged between the inner space and the vapor steam extraction system and is designed for supplying a sealing (Continued)

liquid, wherein a labyrinth seal, a brush seal with metallic bristles, a brush seal with bristles made of natural fibers and/or a brush seal made of synthetic fibers is provided for sealing off with respect to the inner space and the vapor steam extraction system.

11 Claims, 2 Drawing Sheets

(56) References Cited

U.S. PATENT DOCUMENTS

| | | | | |
|---|---|---|---|---|
| 1,759,074 | A | * | 5/1930 | Van Rijswijk .......... F01D 11/06 277/423 |
| 1,867,236 | A | | 7/1932 | Van Rijswijk |
| 1,922,017 | A | * | 8/1933 | Guy ....................... F01D 11/02 415/168.4 |
| 2,199,250 | A | | 4/1940 | Stroebel |
| 2,965,398 | A | * | 12/1960 | Keller ..................... F01D 11/04 277/304 |
| 3,471,157 | A | * | 10/1969 | Swearingen ............. F16J 15/40 277/431 |
| 3,510,177 | A | * | 5/1970 | Shimula .................. F16J 15/40 277/563 |
| 3,949,996 | A | * | 4/1976 | Inoue .................. F16C 32/0651 277/432 |
| 3,959,973 | A | * | 6/1976 | Meylan ................... F01D 11/06 60/646 |
| 4,189,156 | A | * | 2/1980 | Geary, Jr. ............... F01D 11/04 277/304 |
| 4,191,021 | A | | 3/1980 | Kuroda Michio |
| 5,632,492 | A | * | 5/1997 | Lehmann ................ F01D 11/04 277/409 |
| 6,918,252 | B2 | | 7/2005 | Amir Nadav |
| 7,544,039 | B1 | * | 6/2009 | Pelfrey ................... F01D 5/085 415/168.4 |
| 7,854,584 | B2 | * | 12/2010 | Lusted ................... F01D 11/001 277/355 |
| 8,066,286 | B2 | * | 11/2011 | Neef ..................... F01D 11/001 277/355 |
| 2008/0128995 | A1 | | 6/2008 | Mesing et al. |
| 2008/0290604 | A1 | | 11/2008 | Lusted |
| 2012/0082546 | A1 | | 4/2012 | Grieshaber |

FOREIGN PATENT DOCUMENTS

| | | |
|---|---|---|
| CN | 201826902 U | 5/2011 |
| CN | 102459820 A | 5/2012 |
| DE | 467562 C | 10/1928 |
| DE | 4313805 A1 | 11/1994 |
| DE | 19502079 A1 | 7/1996 |
| DE | 102007037311 A1 | 2/2009 |
| EP | 1962000 A1 | 8/2008 |
| EP | 1995465 A1 | 11/2008 |
| EP | 2261464 A1 | 12/2010 |
| GB | 1164201 A | 9/1969 |
| GB | 2297363 A | 7/1996 |
| JP | S368301 | 1/1956 |
| JP | S61226506 A | 10/1986 |
| JP | H0328579 A | 2/1991 |
| JP | H10103018 A | 4/1998 |
| JP | 2000120877 A | 4/2000 |
| JP | 2003507672 A | 2/2003 |
| JP | 2008286216 A | 11/2008 |
| RU | 2340794 C1 | 12/2008 |
| SU | 677301 A1 | 10/1977 |
| SU | 752084 A1 | 7/1980 |

* cited by examiner

SEALING ARRANGEMENT OF A STEAM TURBINE IN WHICH A SEALING LIQUID AND A VAPOR STEAM EXTRACTION SYSTEM ARE USED

CROSS REFERENCE TO RELATED APPLICATIONS

This application is the US National Stage of International Application No. PCT/EP2013/062464 filed Jun. 17, 2013, and claims the benefit thereof. The International Application claims the benefit of European Application No. EP12177570 filed Jul. 24, 2012. All of the applications are incorporated by reference herein in their entirety.

FIELD OF INVENTION

The invention relates to a sealing arrangement for a duct of a shaft, which rotates about an axis, through a stationary housing which surrounds an inner space which can be subjected to the action of a fluid and from which the shaft emerges, having a seal, which comprises a vapor steam extraction system.

The invention also relates to a method for sealing off a shaft and the housing of a steam turbine.

BACKGROUND OF INVENTION

In the construction of turbomachines, in particular in the construction of steam turbines, these machines are designed in such a manner that a seal is provided, such that no ambient air can penetrate into the steam turbine. For this purpose, use is made of seals of varying type. By way of example, sealing steam is used to prevent the admission of the air into the turbine. However, the sealing steam used for this purpose is taken from the steam circuit and therefore does not contribute to the energy conversion, and this has the effect that the efficiency of the turbine set as a whole is impaired.

FIG. 1 shows the known prior art. A steam turbine 4 designed for low pressure is supplied with live steam via an inflow opening 10. The generation of the live steam is not shown in greater detail in FIG. 1. Some of the live steam is guided on a branch line 11 via a bleed line 7a to the seal 9. The bleed line 7a is accordingly in the form of a sealing steam line 12 and therefore guides sealing steam into a sealing steam region 13. In the sealing steam region 13, the sealing steam moves to the left and to the right through seals, a flow of the sealing steam to the left leading into a vapor steam chamber 14. A slightly lower pressure prevails in this vapor steam chamber 14 than in the surroundings, and therefore a vapor steam extraction system 8 extracts the mixture of air taken in from the surroundings and the steam conducted from the sealing steam region 13. As a result, steam conducted in the steam turbine 4 cannot escape into the surroundings.

The steam, the thermal energy of which is converted into mechanical energy in the steam turbine 4, flows via an outlet opening 15 to a condenser 5. The steam condenses in the condenser 5 to form water and is fed back to the water vapor circuit via a pump 6. The pressure of the sealing steam is above the pressure of the atmosphere. In order to keep the demand for sealing steam and the associated losses as low as possible, seals with the greatest possible efficiency are installed. This can be effected using seals of a large structural length or using high-efficiency sealing systems, e.g. brush seals. The documents U.S. Pat. No. 6,918,252, DE 43 13 805, U.S. Pat. No. 4,191,021 and DE 10 2007 037311 disclose various possibilities in relation to the sealing.

SUMMARY OF INVENTION

The invention now pursues a new way which should make it possible to the required sealing steam. It is therefore an object of the invention to increase the efficiency of a steam turbine.

This object is achieved by a sealing arrangement for a duct of a shaft, which rotates about an axis, through a stationary housing which surrounds an inner space which can be subjected to the action of a fluid and from which the shaft emerges, having a seal, which comprises a vapor steam extraction system, wherein provision is made of a feed line, which is arranged between the inner space and the vapor steam extraction system and is designed for supplying a sealing liquid, and wherein the sealing liquid undergoes a phase change after it has been supplied.

Moreover, this object is achieved by a steam power plant comprising a steam turbine with a sealing arrangement according to the invention.

Moreover, this object is achieved by a method for sealing off a shaft and the housing of a steam turbine, wherein a vapor steam extraction system is provided and a sealing liquid is used.

The invention therefore proposes to minimize the losses by dispensing entirely with the use of sealing steam. Instead, the invention proposes to use a sealing liquid instead of sealing steam. The sealing liquid used is water, for example. The advantage therefore consists in the fact that a previously required sealing steam system of a steam turbine set can be dispensed with entirely. This leads to a reduction in costs, which inevitably arise from pipework of the sealing steam system. As a result, the sealing steam, which previously did not participate in the energy conversion, can now participate in the energy conversion, and this leads to an increase in efficiency.

The dependent claims specify advantageous developments.

Thus, in a first advantageous development, use is made of a labyrinth seal, in order to minimize the loss of sealing liquid.

In further advantageous developments, the steam turbine is connected to a condenser, the water required for the sealing liquid being taken from the condenser. The water can therefore be taken directly from the water vapor circuit. The feed line is advantageously connected to the hot well of the condenser.

In a particularly advantageous development, the steam power plant is developed in such a manner that the water and the shaft are at temperatures which are such that the water evaporates when it impinges on the shaft or when it passes the seal.

This provides a very good cooling and sealing capability.

DETAILED DESCRIPTION OF INVENTION

An exemplary embodiment of the invention will be explained hereinbelow with reference to FIGS. 2 and 3.

Figure 1:
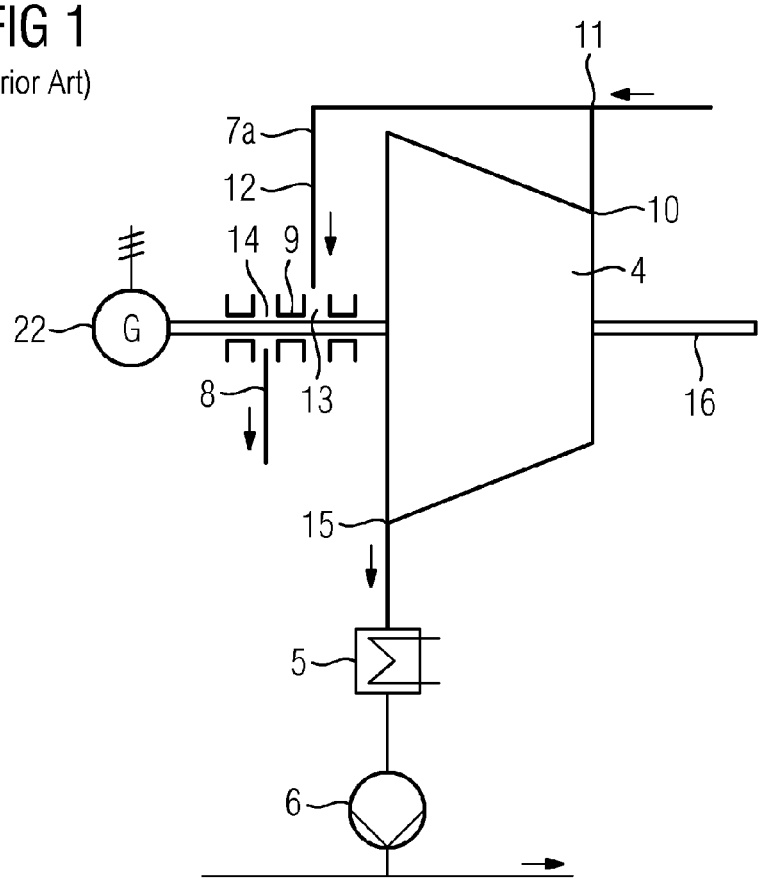
FIG. 1 shows the known prior art.
Figure 2:
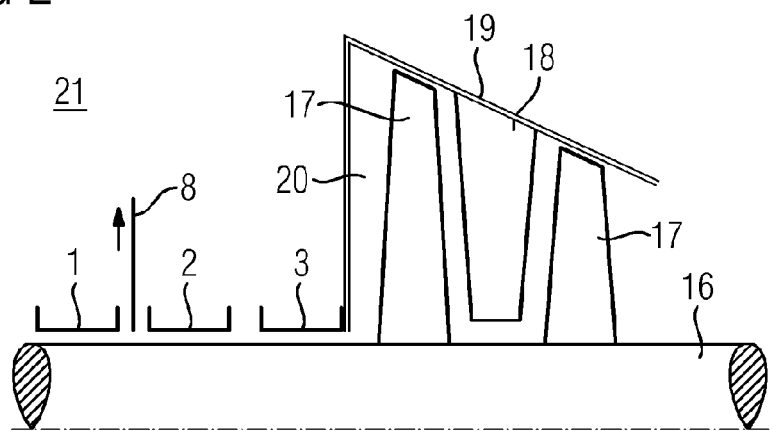
FIG. 2 shows a sectional illustration through a schematically illustrated steam turbine.

FIG. 2 schematically shows a shaft 16 of a steam turbine 4. Arranged on the shaft 16 are a plurality of rotor blades 17, between which a plurality of guide vanes 18 are arranged fixedly on a housing 19. In order that the process steam located in a flow channel 20 does not flow into the surroundings 21, provision is made of a first seal 3. A second seal 2 and a third seal 1 are arranged spaced apart toward the surroundings 21.

Process steam can flow out between the first seal 3 and the shaft 16. For this reason, a sealing liquid is made to flow from a bleed line 7 between the second seal 2 and the first seal 3. This sealing liquid can extend as far as the surroundings 21 and as far as the flow channel 20. A vapor steam extraction system 8 is arranged between the third seal 1 and the second seal 2. As a result, no process steam can flow from the flow channel 20 into the surroundings 21.

Figure 3:
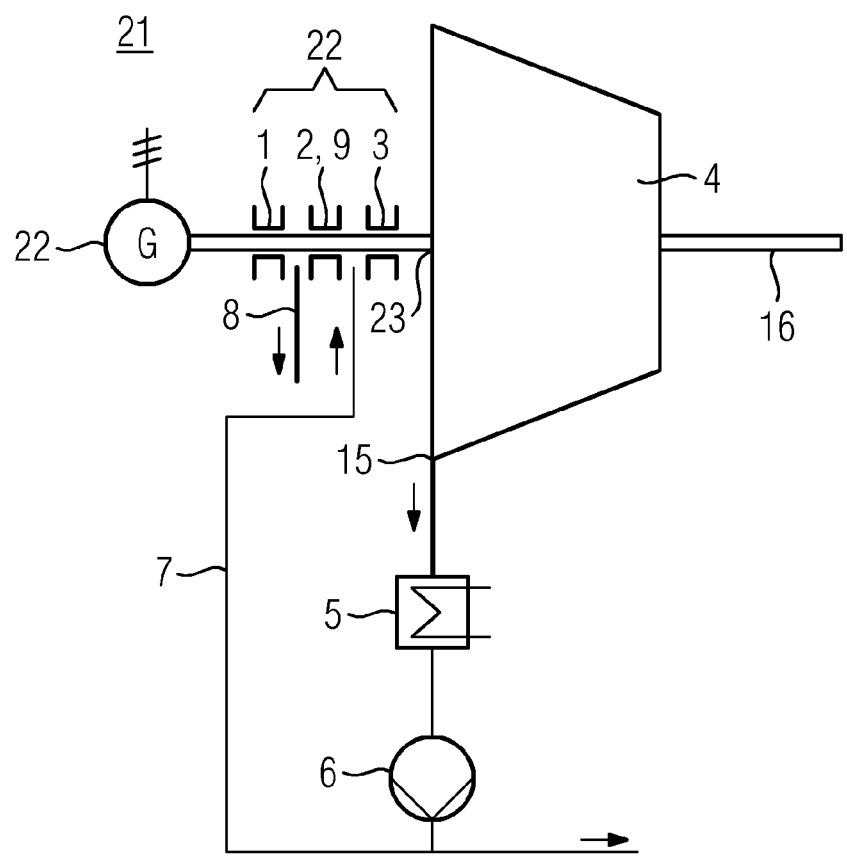
FIG. 3 shows a schematic illustration of a seal according to the invention.

As shown in FIG. 3, it is now the case according to the invention that the bleed line 7 is connected to the output of the pump 6, such that a sealing liquid rather than a sealing steam impinges on the shaft.

The first seal 3, the second seal 2 and the third seal 1 therefore form a sealing arrangement 22. This sealing arrangement 22 is used for the realization of a duct 23 of a shaft 16, which rotates about an axis, through a stationary housing (not shown in more detail). An inner space which can be subjected to the action of fluid and from which the shaft 16 protrudes is enclosed in said stationary housing. The seals used can be conventional labyrinth seals, brush seals with metallic bristles, brush seals with bristles made of natural fibers and/or brush seals with bristles made of synthetic fibers (aramid). In addition, simple annular gaps or conical annular gaps are possible as seals.

A deionate or feed water is used as the sealing liquid. This sealing liquid is present in a steam power plant in any case, and therefore no additional sealing liquid sources have to be taken into consideration.

The utilization of feed water is advantageously close by, since it is available in spatial proximity to the steam turbine 4, e.g. in the hot well of the condenser 5. The increase in the pressure level to supply the sealing region can be effected either by an auxiliary unit or by the pumps which are present for carrying away the feed water to the condenser 5. Simple control mechanisms ensure that the pressure difference between the atmosphere and the sealing liquid is only small. It is therefore possible to keep the quantity of fluid used for sealing low. A particular advantage can be realized when using synthetic fibers, e.g. as in stuffing boxes, in the region in which steam turbines 4 are sealed off. In this case, the water which is introduced and is at a defined temperature close to boiling point is evaporated at a pressure between the pressure of the sealing fluid and that of the steam space to be sealed off, which is under vacuum, by the pressure difference at the warmed-through shaft. The accompanying increase in volume, which is constant over the fiber bundle and which amounts to a factor of around 1000, leads to an optimum sealing action of the stuffing box with a greatly reduced demand for sealing fluid.

In this respect, the properties of the synthetic fiber bundle can have a positive effect in particular compared to other possible solutions, since these fibers have a very large evaporation surface area on account of the small fiber diameters and also have good transport properties by way of the capillary action. The low tendency toward adhesion compared to other fibers can be further improved by way of suitable coating systems for the fibers.

The invention claimed is:

1. A sealing arrangement for a duct of a shaft, which rotates about an axis, through a stationary housing which surrounds an inner space which can be subjected to the action of a fluid and from which the shaft emerges, comprising:
   a seal, which comprises a vapor steam extraction system,
   a feed line, which is arranged between the inner space and the vapor steam extraction system and is designed for supplying a sealing liquid, and
   a labyrinth seal, a brush seal with metallic bristles, a brush seal with bristles made of natural fibers and/or a brush seal made of synthetic fibers for sealing off with respect to the inner space and the vapor steam extraction system.

2. The sealing arrangement as claimed in claim 1, wherein the feed line is designed for supplying water as the sealing liquid.

3. The sealing arrangement as claimed in claim 1, wherein the seal is in the form of a stuffing box.

4. The sealing arrangement as claimed in claim 3, wherein fibers are used as the stuffing box.

5. A steam power plant comprising
   a steam turbine with a sealing arrangement as claimed in claim 1, and
   a condenser,
   wherein the feed line is connected to the condenser.

6. The steam power plant as claimed in claim 5, wherein the feed line is connected to the hot well of the condenser.

7. The steam power plant as claimed in claim 5, wherein the water and the shaft are at temperatures which are such that the water evaporates when it impinges on the shaft.

8. The steam power plant as claimed in claim 5, wherein the seal is in the form of a stuffing box between the feed line and the vapor steam extraction system.

9. The steam power plant as claimed in claim 8, wherein the stuffing box comprises synthetic fibers.

10. The sealing arrangement as claimed in claim 1, wherein the synthetic fibers comprise aramid.

11. The sealing arrangement as claimed in claim 4, wherein the fibers comprise synthetic fibers used as the stuffing box.

* * * * *